3,203,046
SCREW MELTER
Abraham Stein, Ramos Mejia, Argentina
Filed Apr. 11, 1962, Ser. No. 198,387
2 Claims. (Cl. 18—12)
(Filed under Rule 47(b) and 35 U.S.C. 118)

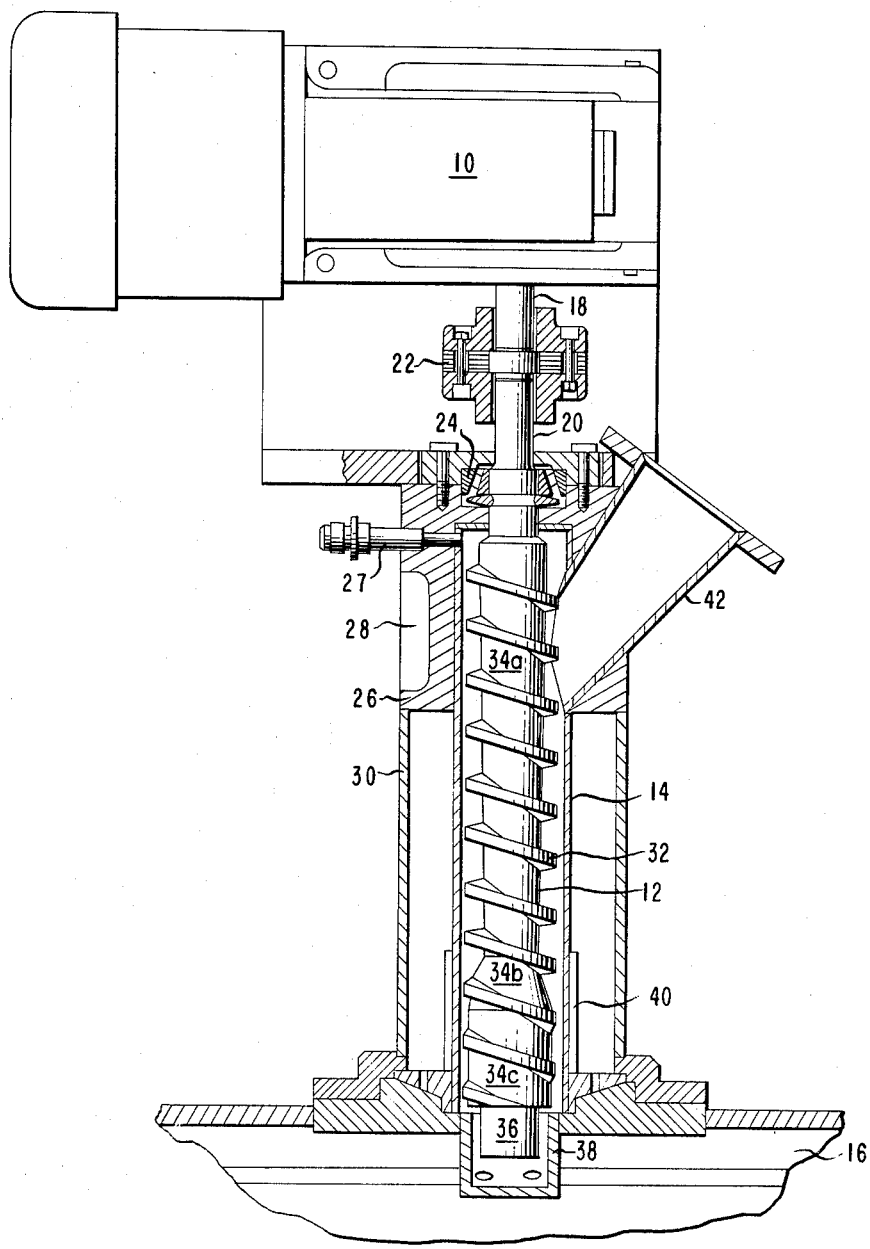

This invention relates generally to the production of articles shaped from thermoplastic materials and more particularly to improvements in an apparatus useful in the melt extrusion of such materials.

It is well known that granular thermoplastic materials such as nylon flake can be fed to a screw melter, heated to the molten condition and discharged under pressure to a spinning block or other extrusion device. It is equally well known that such factors as screw speed, holdup time in the melter and volumetric throughput variations can have adverse effects on product uniformity and equipment performance.

The most important object of the present invention is to provide a screw melter of such a construction that holdup time is reduced to a minimum and molten material is discharged at a substantially constant pressure notwithstanding throughput variations.

Another important object of the invention is the provision of a screw melter in which the screw has a low length/diameter ratio and is operated at a substantially constant speed.

A more particular objective is to provide a screw having a shaft so configured as to not only maintain a constant discharge pressure but also to maintain that pressure effectively in the event of a backflow to the melter from a downstream flow system.

These objectives are accomplished in a screw melter having a barrel into which granular thermoplastic material is introduced and from which the same material is discharged in a molten condition. A screw is mounted in and extends longitudinally of the barrel. It includes a shaft having a helix thereon, the shaft being tapered inwardly to a minimum diameter in an initial feed length, tapered outwardly to a maximum diameter in an intermediate compression length and of maximum diameter in a terminal metering length.

Other objectives will be apparent from the following specification wherein reference is made to the accompanying drawing in which the embodiment chosen for illustration has been shown in section.

The illustrated screw melter includes generally, as components thereof, an asynchronous electrical motor 10, a screw 12, a screw barrel 14 and a manifold 16 into which material is dishcarged from screw 12.

Motor 10 has a shaft 18 which is connected to an extension 20 of screw 12 by a flexible coupling 22. Extension 20 is carried by a thrust bearing 24 which is mounted in a casting 26 having cooling fins 28. As illustrated, casting 26 surrounds the upper portion of barrel 14 and is provided with an inert gas supply conduit 27. Beneath casting 26, barrel 14 is enclosed in a jacket 30.

The body of screw 12 includes a continuous helix 32 of constant pitch and diameter carried by a shaft. The latter has a first length 34a which tapers gradually from a maximum diameter adjacent the top of barrel 14 to a minimum diameter, a second length 34b which tapers abruptly to a maximum diameter and a third length 34c of constant maximum diameter. In the drawing, the degree of taper in length 34a has been exaggerated. A plug 36 on the lower extremity of screw 12 projects into a perforated cap 38 situated in the manifold 16 of a spinning block. Heat is transferred to the flow channel surrounding lengths 34b, 34c by an electrical heating installation 40.

In operation, granular thermoplastic material is introduced at an inlet nozzle 42 and carried downwardly through feed length 34a by helix 32 to the compression zone surrounding shaft length 34b where it is heated to the molten condition by the action of heater 40. From the compression zone, molten material is conveyed through the metering length of the flow channel around shaft length 34c and is discharged at constant pressure to manifold 16 through cap 38. Motor 10 and screw 12 operate at a substantially constant speed.

In the past, various difficulties have been encountered with screw melters used in the production of filaments, films and the like from polyamides, polyethylenes, polypropylenes, polyesters and other thermoplastic polymers. For example, the use of a screw having a high length/diameter ratio has been mandatory because of the possibility that molten polymer would bridge and block the hopper outlet. The extended holdup time resulting from the use of a long screw frequently leads to a high monomer content of polycaproamide (6-nylon) and to degradation in polyhexamethylene adipamide (66-nylon). Such thermoplastic screw extruders normally have a length/diameter ratio of 16–24. With the instant screw melter, holdup time is reduced to a minimum by the use of a screw 12 having a length/diameter ratio of less than about 14. The possibility of molten polymer bridging the inlet nozzle 42 is avoided by the supply 27 of an inert gas and by the provision of cooling fins 28 which factors insure a cold zone in the upper extremities of barrel 14. Additionally, the use of a screw in which shaft length 34a is approximately eight times the length of the shaft length 34b or 34c not only tends to prevent the backflow of molten polymer to the inlet nozzle but also insures that it will be brought quickly to the desired melt temperature.

When the system into which a constant pressure screw melter discharges is subjected to throughput variations, it has always been necessary to use a synchronous motor equipped with accurate speed control devices in order to compensate for such flow variations. For example, where a melter supplies a number of metering pumps, each of which in turn supplies a number of spinning positions with molten nylon, closing down one position or pump must be compensated for by a reduction in the speed of screw 12. If such adjustments are not made, the melt backs up to the melter and a ring plug of solid polymer forms on the screw, interrupting the entire process. With the instant screw melter, the need for accurate speed control and the difficulties encountered with ring plugs are avoided by the oppositely tapered conical configurations of shaft lengths 34a, 34b, presenting a relief section which interrupts a backflow of melt. As a plug develops, it travels up shaft length 34b because of its abrupt taper. When it meets the reverse taper of feed length 34a, it is stripped from the shaft and returned to the melt by the action of helix 32. In view of the facility with which a backflow to the melter is returned to the melt zone, there is no need for a screw speed reduction when a position is closed down and no possibility of an irregular supply to the spinning pumps when that position is returned to service, i.e., the increased demand does not lead to a melt level drop in manifold 16.

In actual practice, a screw melter made in accordance with the teachings of the present invention and driven by a 3-horsepower asynchronous motor has been employed in the melt extrusion of 6-nylon under varying conditions of polymer viscosity and throughput rate. In each run, the screw speed and melt zone temperatures were substantially the same, a satisfactory extrusion was obtained and no operational difficulties were encountered. In this respect, good results have been accomplished with constant speed screws having a length/diameter ratio as low as 7 and with throughput rates varying from 6–33 pounds/hour.

It is apparent that many changes and modifications may be made in the disclosed screw melter without departing from the spirit of the present inventtion which is accordingly intended to be limited only by the scope of the appended claims.

Having thus described the invention, what is claimed as new and desired to be secured by Letters Patent is:

1. A screw melter comprising: a jacketed screw barrel having an inlet for granular material and an outlet; an elongated screw rotatably mounted in said barrel and extending from said inlet to said outlet, said screw including a shaft having a helix of constant pitch and diameter thereon, said shaft tapering gradually to a minimum diameter and abruptly to a maximum diameter in successive feed and compression lengths and terminating in a metering length having said maximum diameter; and a heating means surrounding said barrel in the compression and metering lengths.

2. A screw melter comprising: a vertically disposed, jacketed screw barrel having an inlet for granular material and an outlet; a conduit communicating with the interior of said barrel above said inlet for the admission of a gaseous coolant; an elongated screw rotatably mounted in said barrel and extending from said inlet to said outlet, said screw including a shaft having a helix of constant pitch and diameter thereon, said shaft tapering inwardly through a substantial portion of its length to a minimum diameter, tapering outwardly to a maximum diameter in a succeeding short length and having said maximum diameter in a terminal short length communicating with said outlet, said screw having a length/diameter ratio of less than 14; and a heating means surrounding said barrel through the short lengths of said shaft.

References Cited by the Examiner

UNITED STATES PATENTS

| 2,369,553 | 2/54 | Fields | 18—12 XR |
|---|---|---|---|
| 2,407,503 | 9/46 | Magerkurth et al. | 18—12 |
| 2,607,077 | 8/52 | Dulmage | 18—12 |
| 2,707,306 | 5/55 | Weber et al. | 18—8 |
| 2,780,834 | 2/57 | Bernhardt | 18—12 |
| 2,897,541 | 8/59 | Orsini | 18—12 |
| 3,023,456 | 3/62 | Palfey | 18—12 |
| 3,040,005 | 6/62 | Bernhardt et al. | 18—12 |

WILLIAM J. STEPHENSON, *Primary Examiner.*

MICHAEL V. BRINDISI, *Examiner.*